US009029795B2

(12) United States Patent
Sando et al.

(10) Patent No.: US 9,029,795 B2
(45) Date of Patent: May 12, 2015

(54) RADIATION GENERATING TUBE, AND RADIATION GENERATING DEVICE AND APPARATUS INCLUDING THE TUBE

(71) Applicant: Canon Kabushiki Kaisha, Tokyo (JP)

(72) Inventors: Kazuhiro Sando, Atsugi (JP); Noritaka Ukiyo, Inagi (JP); Yasue Sato, Machida (JP); Yoshihiro Yanagisawa, Fujisawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/155,207

(22) Filed: Jan. 14, 2014

(65) Prior Publication Data

US 2014/0203183 A1 Jul. 24, 2014

(30) Foreign Application Priority Data

Jan. 18, 2013 (JP) ................................ 2013-006831

(51) Int. Cl.
*H01J 35/08* (2006.01)
*G01N 23/04* (2006.01)

(52) U.S. Cl.
CPC ...................................... *H01J 35/08* (2013.01)

(58) Field of Classification Search
CPC ................................. H01J 35/08; G01N 23/04
USPC ............................................. 250/393, 396 R
See application file for complete search history.

(56) References Cited

U.S. PATENT DOCUMENTS

2009/0080617 A1* 3/2009 Andrews ....................... 378/142

FOREIGN PATENT DOCUMENTS

JP 2012124098 A 6/2012

* cited by examiner

*Primary Examiner* — David Porta
*Assistant Examiner* — Faye Boosalis
(74) *Attorney, Agent, or Firm* — Canon USA Inc. IP Division

(57) ABSTRACT

A radiation generating tube includes an electron emitting source configured to emit an electron beam; a target configured to generate radiation when the target is irradiated with the electron beam; a rear shield body having a tube-shaped electron passage with openings thereof at each end of the passage, and being located at the side of the electron emitting source with respect to the target, a first opening of the passage facing the electron emitting source and being separated from the electron emitting source, a second opening of the passage facing the target; and a brazing material joining the rear shield body with a peripheral edge of the target, at a position separated from the second opening. A closed space isolated from the electron passage is provided between the target and the rear shield body.

15 Claims, 5 Drawing Sheets

RADIATION GENERATING TUBE, AND RADIATION GENERATING DEVICE AND APPARATUS INCLUDING THE TUBE

BACKGROUND OF THE INVENTION

1. Field of the Invention

The present invention generality relates to radiative energy and apparatuses thereof, in particular it relates to a radiation generating tube that generates radiation rays by irradiating a target with electrons and that can be applied to radiography. The present invention also relates to a radiation generating device using the radiation generating tube, and to a radiation imaging apparatus using the radiation generating device.

2. Description of Related Art

A radiation generating device used as a radiation source generates radiation rays by emitting electrons from an electron source, and causing the electrons to collide with a target electrode. The radiation source and the target are typically arranged within a radiation generating tube, which is kept in a vacuum. The radiation is generated, by bringing the electrons into collision with the target, which is made of a metal material having a large atomic number, such as tungsten.

To efficiently generate electrons from the electron source and promote an increase in life of the radiation generating device, it is necessary to keep the inside of the radiation generating tube in vacuum for a long period. Therefore, appropriate sealing of the vacuum environment is necessary. Also, in the radiation generating device, since radiation rays generated from the target are radiated in all directions, unnecessary radiation rays other than radiation rays necessary for imaging are typically blocked by providing a rear shield body. Japanese Patent Application Laid-Open No. 2012-124098 discloses a radiation generating device using a transparent target. The technique disclosed in Japanese Patent Application Laid-Open No. 2012-124098 keeps the inside of a radiation generating tube in a vacuum by brazing the periphery of a transparent substrate having a target layer to a shield body of the radiation generating tube.

Therefore, a known method of keeping the radiation generating device in vacuum and blocking unnecessary radiation rays may be a method of sealing a radiation generating tube in vacuum by brazing a target to the above-described rear shield body. A brazing material used for joining is a low-melting-point material having a melting point lower than the melting points of both the target material and the rear shield body. Owing to this, the brazing material that joins the peripheral edge portion of the target with the shield body may be softened and molten by heat generated when the radiation generating tube is operated, and the brazing material may flow to a target-layer formation region or an electron passage. In this case, if an electron beam is emitted onto the flowing brazing material, a radiation ray with a radiation quality different than the radiation quality caused by the target material alone may be radiated forward, and consequently the radiation quality caused by the target material may be decreased.

SUMMARY OF THE INVENTION

One aspect of the present invention relates to a radiation generating tube that can be continuously used for a long period of time and can stably generate radiation rays throughout its lifetime. To that end, advantageously, the radiation generating tube does not cause a decrease in radiation quality due to a flowing brazing material. The present invention also relates to a radiation generating device using the radiation generating tube, and a radiation imaging apparatus using the radiation generating device.

In particular, in accordance with at least one embodiment of the present invention, a radiation generating tube includes: an electron emitting source configured to emit an electron beam; a target configured to generate radiation when the target is irradiated with the electron beam; a rear shield body having a tube-shaped electron passage with openings thereof at each end of the passage, and being located at the side of the electron emitting source with respect to the target, a first opening of the passage facing the electron emitting source and being separated from the electron emitting source, a second opening facing the target; and a brazing material joining the rear shield body with a peripheral edge of the target, at a position separated from the second opening. A closed space isolated from the electron passage is provided between the target and the rear shield body.

In accordance with other embodiments of the present invention, a radiation generating device includes the above-described radiation generating tube; and a driving power supply electrically connected to the radiation generating tube and configured to drive the radiation generating tube.

In accordance with further embodiments of the present invention, a radiation imaging apparatus includes the above-described radiation generating device; a radiation detector configured to detect radiation emitted from the radiation generating device and transmitted through a test body; and an apparatus control unit configured to control the radiation generating device and the radiation detector in an associated manner.

Further features of the present invention will become apparent from the following description of exemplary embodiments with reference to the attached drawings.

DESCRIPTION OF THE EMBODIMENTS

Embodiments of the invention are described below with reference to the drawings; however, the invention is not limited to these embodiments. Related or known art is applied to parts not particularly illustrated or described in this specification.

Figure 1A:
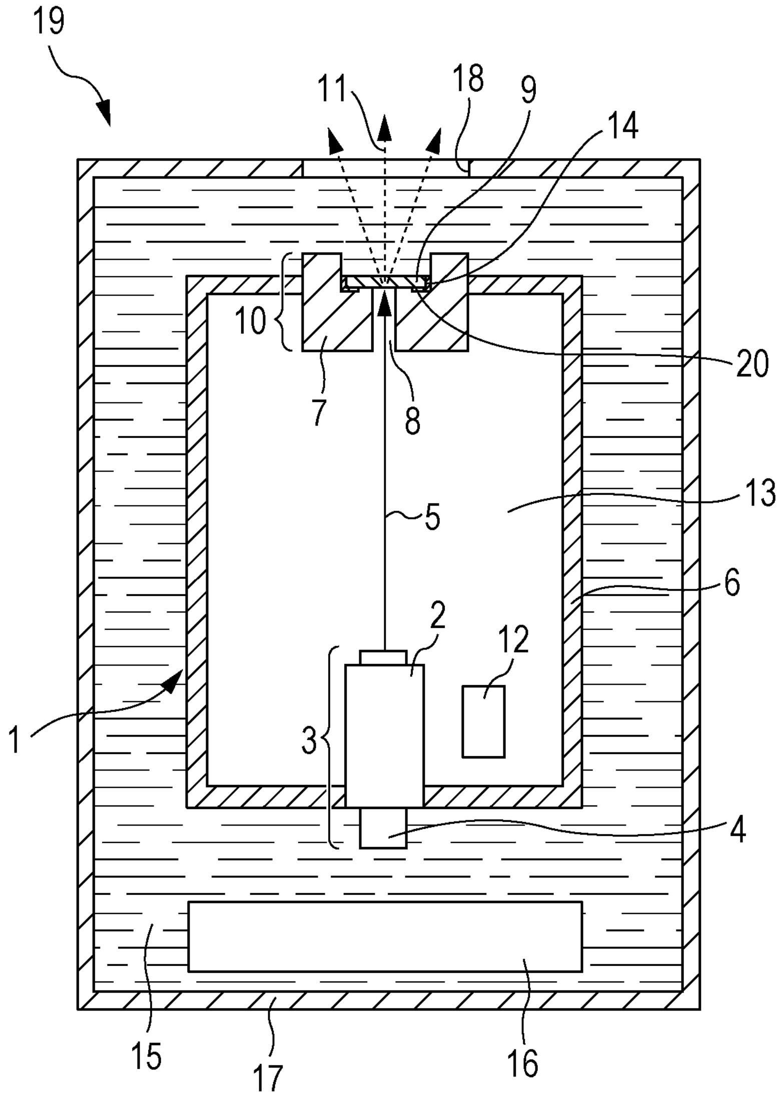
FIGS. 1A, 1B and 1C are schematic views showing a radiation generating tube and a radiation generating device according to an embodiment (EXAMPLE 1) of the invention.
Figure 1B:
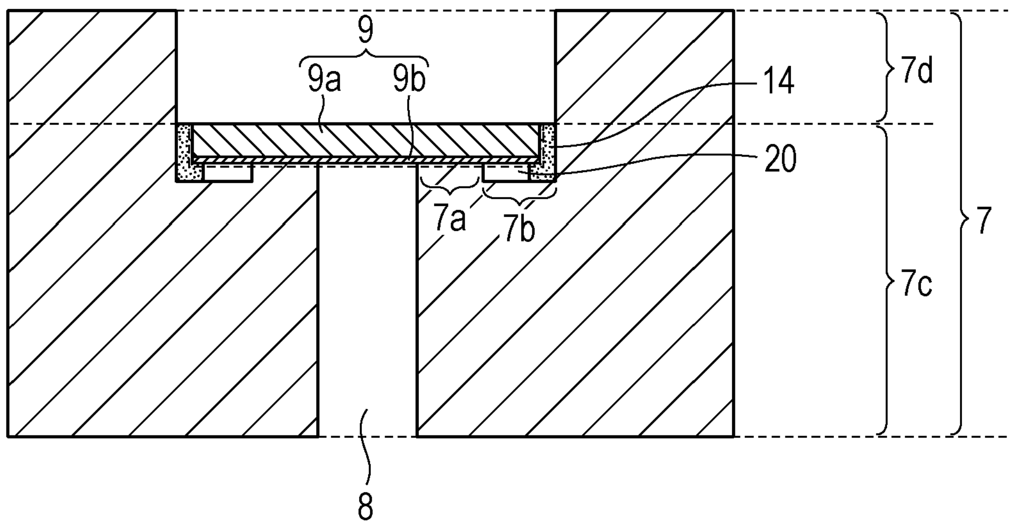
Figure 1C:
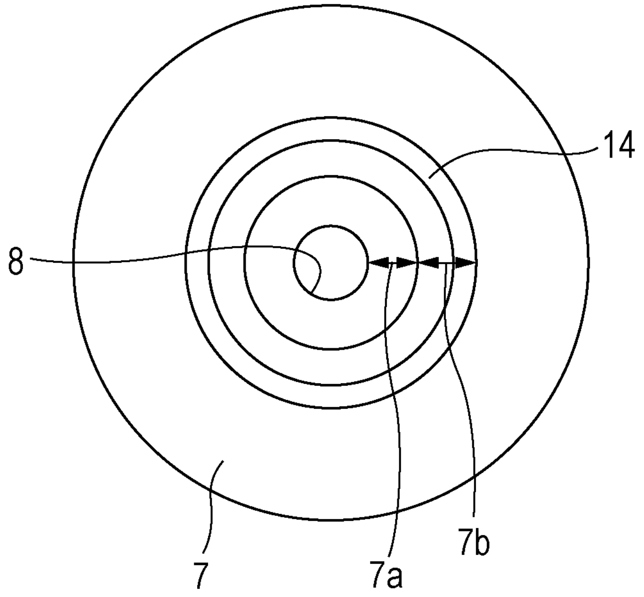

A configuration of a radiation generating device according to an embodiment of the invention is described with reference to FIGS. 1A to 1C. FIG. 1A is a schematic view showing a radiation generating device according to an embodiment of the invention. FIG. 1B is a cross-sectional view showing an anode in FIG. 1A in an enlarged manner. FIG. 1C is a plan view showing the anode in FIG. 1B without a target 9, from the side of a radiation extraction window 18.

A radiation generating device 19 includes a radiation generating tube 1 and a driving power supply 16 in an envelope 17 (or housing). The envelope 17 includes a radiation extraction window 18. In the envelope 17, a space surrounding the tube 1 is filled with insulating liquid 15.

The radiation generating tube 1 includes an electron emitting source 3, an anode 10, and a vacuum chamber 6. A getter 12 may be provided to keep the degree of vacuum of the vacuum chamber 6 if required for, for example, operational stability and life of the electron emitting source 3.

The electron emitting source 3 includes a current introducing terminal 4 and an electron emitting unit 2. An electron emitting mechanism of the electron emitting source 3 may be an electron emitting source, the electron emission amount of which can be controlled from the outside of the vacuum chamber 6. A hot-cathode electron emitting source, a cold-cathode electron emitting source, etc., may be applied to the electron emitting mechanism. The electron emitting source 3 is electrically connected to the driving power supply 16 arranged outside the vacuum chamber 6 through the current introducing terminal 4 penetrating through the vacuum chamber 6, so that the electron emission amount and the ON/OFF state of electron emission can be controlled.

The electrons emitted from the electron emitting unit 2 becomes an electron beam 5 having an energy in a range from about 10 to about 200 keV. The electron beam 5 is shaped by an extraction grid (not shown) and an accelerating electrode (not shown). The electron beam is made incident on the target 9 arranged opposite to the electron emitting unit 2. The extraction grid and the accelerating electrode may be embedded in a hot-cathode electron gun tube. Also, a correcting electrode for adjusting an irradiation spot position of an electron beam and astigmatism of an electron beam may be added to the electron emitting source 3. In this case, the correcting electrode is connected to a correcting circuit (not shown) arranged outside.

As seen in FIG. 1B, the anode 10 includes at least the target 9 having a target substrate 9*a* and a target layer 9*b*, and a rear shield body 7*c*. The rear shield body 7*c* and the peripheral edge of the target 9 are joined with a brazing material 14 at a joint portion.

As shown in FIG. 1B, the target layer 9*b* is supported by the target substrate 9*a* at one of the surfaces of the target substrate 9*a*. The target layer 9*b* typically contains a metal material having an atomic number being 26 or larger, as a target material. In particular, a material with a thermal conductivity and a melting point higher than that of the brazing material can be suitable. To be more specific, any of metal materials, such as tungsten, molybdenum, chromium, copper, cobalt, iron, rhodium, and rhenium; or an alloy material of these metal materials can be suitably used. The target layer 9*b* has a thickness in a range from 1 to 15 μm although an optimal value is different because the penetration depth of an electron beam into the target layer 9*b*, that is, the radiation generation region is different depending on the acceleration voltage with which the electron beam is generated.

The target substrate 9*a* and the target layer 9*b* can be integrated by sputtering, vapor deposition, or other similar technology. For another method, the target substrate 9*a* and the target layer 9*b* can be integrated by separately forming a thin film of the target layer 9*b* with a predetermined thickness by rolling or grinding, and joining the target layer 9*b* with the target substrate 9*a* by diffusion joining under a high-temperature and high-pressure condition.

The target substrate 9*a* has to have high transmissivity for radiation rays, high thermal conductivity, and high resistance to sealing in vacuum. For example, diamond, silicon nitride, silicon carbide, graphite, or beryllium may be used for the target substrate 9*a*. To be more specific, diamond, aluminum nitride, or silicon nitride having a lower transmissivity for radiation rays than the transmissivity of aluminum and a higher thermal conductivity than the thermal conductivity of tungsten is more suitable. The thickness of the target substrate 9*a* is only required to satisfy the above-described functions, and can be in a range from 0.3 to 2 millimeters (mm) although the thickness is different depending on the material. In particular, diamond is better suitable because diamond has a markedly higher thermal conductivity than the thermal conductivities of other materials, a high transmissivity for radiation rays, and a property of likely keeping the vacuum condition. However, the thermal conductivities of these materials significantly decrease as the temperature increases, and hence it is necessary to restrict an increase in temperature of the target substrate 9*a* as much as possible.

The rear shield body 7*c* has a tube-shaped electron passage 8. Electrons are incident from one end of the electron passage 8 (an opening at an end at the side of the electron emitting source 3), the target 9 provided at the other end of the electron passage 8 (at the side opposite to the electron emitting source 3) is irradiated with the electrons, and thus radiation rays are generated. At the side of the electron emitting source 3 with respect to the target 9, the electron passage 8 serves as a passage or path for guiding the electron beam 5 to an electron-beam irradiation region (a radiation generation region) of the target layer 9*b*. At the side of the radiation extraction window 18 with respect to the target 9, the electron passage 8 serves as a passage for radiating radiation rays to the outside. Unnecessary radiation rays among radiation rays radiated from the target layer 9*b* toward the electron emitting source 3 and radiation rays radiated from the target layer 9*b* toward the radiation extraction window 18 are blocked by the inner wall of the electron passage 8.

In this embodiment, the rear shield body 7*c* forming the anode 10 is a portion located at the side of the electron emitting source 3 with respect to the target layer 9*b*. Additionally to the rear shield body, the anode 10 may include a front shield body 7*d* at the side opposite to the electron emitting source 3 with respect to the target layer 9*b*. The front shield body 7*d* and the rear shield body 7*c* may be separated from each other so as to nip the target 9, or may be integrally formed (connected to each other) into a single body. Regardless of whether front shield body 7*d* and the rear shield body 7*c* are formed separately or integrally, the front shield body 7*d* and the rear shield body 7*c* are collectively called a shield body 7.

The electron passage 8 is circular in plan view (has a circular cross-section), as seen from the side of the radiation extraction window 18, as illustrated in FIG. 1C. However, the illustration of FIG. 1C is not limiting, and the cross-sectional shape of the electron passage 8 may be properly selected. For example, the shape may be rectangular or elliptic. Also, if the rear shield body 7*c* is in contact with the insulating liquid 15, the rear shield body 7*c* also has a function of transmitting heat generated at the target 9 to the insulating liquid, and releasing the heat to the outside of the radiation generating tube 1.

The radiation generating tube 1 of this embodiment may include a form in which the envelope 17 is connected to the anode 10. To be specific, a portion of the front shield body 7*d* or the rear shield body 7*c* may be connected to the envelope

17, so that an effect of releasing heat to the atmosphere outside the envelope 17 through the shield body 7 can be exhibited.

A material, which may be used for the rear shield body 7*c*, is only required to block radiation rays generated with a tube voltage in a range from 30 to 150 kV. For example, any material selected among tungsten, tantalum, copper, silver, molybdenum, zirconium, and niobium, or an alloy of at least one of these materials may be used.

The rear shield body 7*c* may be joined with the target 9, for example, by brazing. It is important for the joint by brazing to keep the inside of the vacuum chamber 6 in vacuum. The brazing material for brazing may be properly selected depending on the material and heat-resistance temperature of the rear shield body 7*c*. For example, if the target substrate 9*a* becomes particularly high temperature, the brazing material for the high-melting-point metal may be a chromium-vanadium (Cr—V) alloy, a titanium-tantalum-molybdenum (Ti—Ta—Mo) alloy, a titanium-vanadium-chromium-aluminum (Ti—V—Cr—Al) alloy, a titanium-chromium (Ti—Cr) alloy, a titanium-zirconium-beryllium (Ti—Zr—Be) alloy, or a zirconium-niobium-beryllium (Zr—Nb—Be) alloy. To focus on the vacuum airtight condition, a brazing material mainly containing gold-copper (Au—Cu) may be used as a brazing material for a high-vacuum device. Alternatively, for example, nickel solder, brass solder, silver solder, or palladium solder may be used.

The vacuum chamber 6 may be formed of glass or ceramic. The inside of the vacuum chamber 6 is an inner space 13 from which the air is evacuated and brought into vacuum (in which the pressure is reduced). The inner space 13 may have at least a degree of vacuum that allows an electron to fly by a distance between the electron emitting source 3 and the target layer 9*b* that radiates radiation rays, as a mean free path of an electron. The degree of vacuum may be $1\times10^{-4}$ Pa or lower. The degree of vacuum may be properly selected with regard to the electron emitting source to be used, the operating temperature, etc. In the case of the cold-cathode electron emitting source or the like, the degree of vacuum may be $1\times10^{-6}$ Pa or lower. To keep the degree of vacuum, the getter 12 may be arranged in the inner space 13, or may be arranged in an auxiliary space (not shown) communicating with the inner space 13.

A configuration of the anode 10 is described below in detail with reference to FIG. 1B. The anode 10 includes the rear shield body 7*c* having the electron passage 8, and the target 9 having the target substrate 9*a* also serving as a radiation transmission window and the target layer 9*b* arranged on the surface of the target substrate 9*a* at the side of the electron emitting source 3.

The target 9 and the rear shield body 7*c* are joined with the brazing material 14 at both a side surface portion of the target 9 and a peripheral edge portion of the target 9 at the side of the electron irradiation surface (at the side of the electron emitting source 3), or at one of the side surface portion and the peripheral edge portion. At this time, the target 9 is supported by an isolating portion 7*a* of the rear shield body. For joining with the brazing material, the brazing material is provided at the entire circumference of the target as shown in FIG. 1C to keep vacuum in the vacuum chamber 6.

Also, FIG. 1C shows a schematic cross section of the rear shield body 7*c* at a position of plane at which the tube-shaped electron passage 8 faces the target 9. The tube-shaped rear shield body 7*c* includes, in order from the center of the tube in a radial direction of the tube, the electron passage 8, the isolating portion 7*a*, a separated portion 7*b*, and the joint portion between the target 9 and the rear shield body 7*c*.

The isolating portion 7*a* is a portion of the rear shield body 7*c* that contacts the rear side of the target 9, and has a function of isolating the electron passage 8 from a closed space 20. The separated portion 7*b* is a portion of the rear shield body 7*c* located with a gap with respect to the target 9, that is, is separated from the target 9. The separated portion 7*b* has a function of determining the range of the closed space 20 together with the isolating portion 7*a*, the target 9, and the joint portion.

With this arrangement, the anode 10 has the closed space 20 surrounded by at least the joint portion having the brazing material 14, the target 9, and the separated portion 7*b*, at a position between the target 9 and the rear shield body 7*c*, at the side of the target layer 9*b* of the target 9.

As shown in FIG. 1B, the closed space 20 is arranged via the isolating portion 7*a*, and is provided independently from the electron passage 8. The closed space 20 has a function of storing the brazing material 14 if part of the brazing material 14 is softened and molten because of an increase in temperature of the anode 10, the part protrudes from the joint portion, and the part leaks to the rear side of the target 9. The radiation generating tube 1 having the closed space 20 has a function of preventing the brazing material 14 from protruding to the electron passage 8 and hence preventing radiation rays from being generated because of the brazing material.

In this embodiment of the invention, the joint portion is a portion joined with a joining material, and includes two joint surfaces being opposite to each other with respect to the thickness of the joining material, and the joining material located between the opposite two joint surfaces.

When the target 9 and the rear shield body 7*c* are brazed, a metallized layer (not shown) is previously provided around the target 9. For the metallized layer, for example, paste is formed by adding a resin bonding material and a dispersion medium to metallizing composition power including a compound containing at least one element selected from titanium (Ti), zirconium (Zr), and hafnium (Hf), as an active metal component. Then, a portion to be metallized is coated with the paste, and the portion is baked at a predetermined temperature. Thus, the metallized layer is obtained. Then, active metal solder is applied to the metallized surface around the target 9. For example, a silver-copper brazing material containing Ti may be used. The target 9 applied with the active metal solder is set at the isolating portion 7*a* provided at the rear shield body 7*c* previously formed to have a predetermined dimension, and the target 9 is baked at a predetermined temperature for a predetermined time. The baking condition is different depending on the type of the active metal solder. In the case of the silver-copper brazing material containing Ti, processing at about 850° C. is suitable.

In this embodiment of the invention, the region adjacent to the joint portion by the brazing material at the side of the target layer 9*b* of the target 9 is the closed space that is isolated from the electron passage through the isolating portion 7*a*. Hence, even if the brazing material is softened, molten, and flows out by heat generated when the radiation generating tube is operated, the brazing material stays in the closed space, and the brazing material does not flow into the target-layer formation region of the electron passage. Accordingly, a problem, in which an electron beam is emitted on the flowing brazing material, a radiation ray having a radiation quality different from the radiation quality of the target material is radiated forward and consequently the radiation quality is decreased, does not occur.

The form relating to the connection between the target 9 and the rear shield body 7*c* according to the embodiment of the invention is not limited to "the isolation effect between the electron passage 8 and the brazing material 14" included in the configuration shown in FIG. 1B, and may include an embodiment in which the connection form is properly modified with regard to the contact pressure of the isolating portion 7*a*, the thermal deformation during operation, etc.

Figure 2:
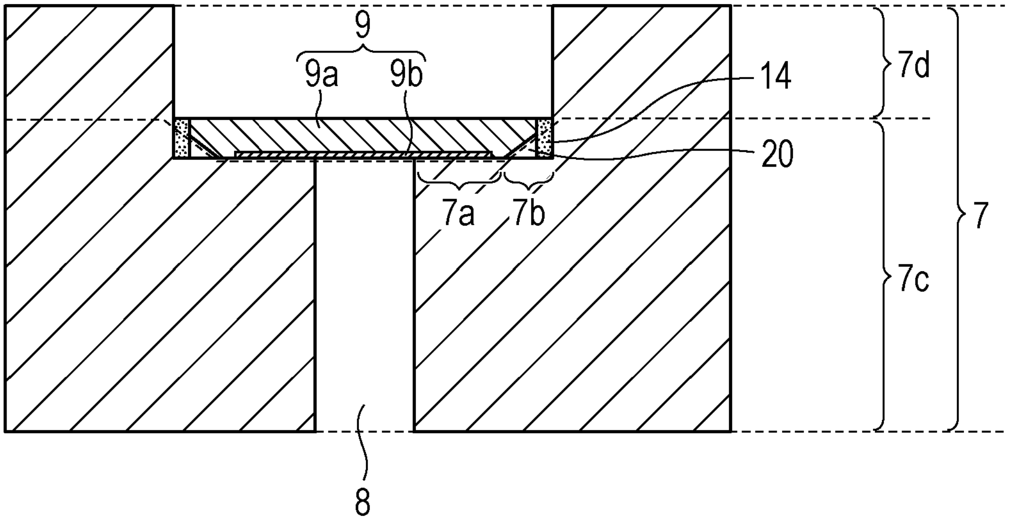
FIG. 2 is a cross-sectional view of an anode of the radiation generating tube and the radiation generating device according to EXAMPLE 2 of the invention.

For example, in FIG. 1B, the isolating portion 7*a* and the separated portion 7*b* are formed by the contact between a partition wall of the rear shield body and the target. In contrast, the invention includes a modification as shown in FIG. 2, in which a tapered portion is provided at the peripheral edge of the target 9, an isolating portion 7*a* is formed at the side of the electron emitting source of the target 9, and a closed space is formed at the peripheral edge of the target 9, so that the contact pressure of the isolating portion is decreased. Further, the invention includes embodiments shown in FIGS. 3 to 5. The detailed description is given in examples (described later).

The radiation generating device and the radiation imaging apparatus using the radiation generating device of the embodiment of the invention have a configuration that the brazing material does not reach the electron passage even if the brazing material joining the target with the shield body flows out, so as not to decrease the radiation quality. Accordingly, the device and apparatus have good performances such that radiation rays can be stably generated and the device and apparatus can be continuously used for a long period.

EXAMPLES

The invention is described in further detail according to examples.

Example 1

EXAMPLE 1 of the invention is described with reference to FIGS. 1A to 1C. In this example, the radiation generating device shown in FIGS. 1A to 1C was fabricated. A fabricating method is described below.

High-pressure-synthesized diamond was prepared as the target substrate 9*a*. The high-pressure-synthesized diamond has a disk shape (a cylindrical shape) with a diameter of 5 mm and a thickness of 1 mm. An organic matter on the surface of the diamond was previously removed by an ultraviolet-ozone (UV-ozone) asher. A titanium layer was formed on one of surfaces with a diameter of 1 mm of the diamond substrate by sputtering with use of argon (Ar) as carrier gas. Then, a tungsten layer with a thickness of 8 μm was formed as the target layer 9*b*. Thus, the target 9 was obtained. A metallized layer with titanium serving as an active metal component was formed around the target 9, and a brazing material made of silver, copper, and titanium was applied thereon. Also, tungsten was prepared as the rear shield body 7*c*. As shown in FIG. 1B, the isolating portion 7*a*, the separated portion 7*b*, and the electron passage 8 were formed. The diameter at the outer periphery side of the separated portion 7*b* was 5.3 mm, the diameter at the inner periphery side of the separated portion 7*b* was 3.6 mm, and the diameter of the cross section of the electron passage 8 was 2.0 mm. The separated portion 7*b* was lower than the isolating portion 7*a* by 1.0 mm. The target 9 applied with the brazing material was set at the rear shield body 7*c* processed to have the above-described shape, the target 9 was baked at 850° C., and thus the anode 10 was fabricated.

Then, as shown in FIGS. 1A to 1C, the anode 10, in which the target 9 and the rear shield body 7*c* were integrated, was positioned so that an impregnated thermoionic gun having the electron emitting unit 2 faces the electron emitting source 3 and the electron beam 5 enters the electron passage 8. The anode 10 was sealed in vacuum and thus served as the radiation generating tube 1. The getter 12 was arranged in the vacuum chamber 6.

Finally, the above-described radiation generating tube 1 was used to define the radiation generating device 19. The radiation generating device 19 included the radiation generating tube 1 and the driving power supply 16 in the envelope 17 having the radiation extraction window 18. The space in the envelope 17 was filled with the insulating liquid 15.

When the spectrum of radiation rays generated from the radiation generating device of this example was measured, the spectrum of silver contained in the brazing material was not observed. Also, an evaluation was made under driving conditions of an applied voltage of 100 kV, current of 10 mA, a pulse width of 100 msec, and a duty of 1/100, for about 56 hours (corresponding to 20000 times of exposure). However, a decrease in radiation quality was not observed, and it was recognized that radiation rays were stably generated. That is, even if the device was continuously used for a long period, good performance could be exhibited.

Example 2

EXAMPLE 2 of the invention is described with reference to FIG. 2. FIG. 2 is a cross-sectional view of the anode 10 in an enlarged manner of the radiation generating device. The anode 10 in this example also has the closed space 20 located at the side of the target layer 9*b* of the target 9, being adjacent to the joint portion, surrounded by the target 9, the rear shield body 7*c*, and the brazing material 14, and provided independently from the electron passage. This example differs from EXAMPLE 1 in that the isolating portion 7*a* and the separated portion 7*b* of the rear shield body 7*c* are located on the same plane, and the target 9 has a tapered portion that is more separated from the separated portion 7*b*, as the tapered portion extends from the center to the peripheral edge of the target 9. Thus, the closed space 20 is formed. In this example, since the rear shield body 7*c* contacts the target layer 9*b* by surfaces, a damage on the target layer 9*b* by a shift of the contact portion caused by a difference between the coefficient of linear thermal expansion of the target 9 and the coefficient of linear thermal expansion of the rear shield body 7*c* when the radiation generating tube is operated can be reduced. Also, the rear shield body can be more easily processed.

The radiation generating device was fabricated in a manner similar to EXAMPLE 1 except that the connection form between the rear shield body and the target layer was different. When the spectrum of radiation rays generated from the radiation generating device of this example was measured, the spectrum of silver contained in the brazing material was not observed. Also, the radiation quality was not decreased even if the device was continuously used for a long period like EXAMPLE 1, and the device had good performance that stably generated radiation rays.

Example 3

Figure 3:
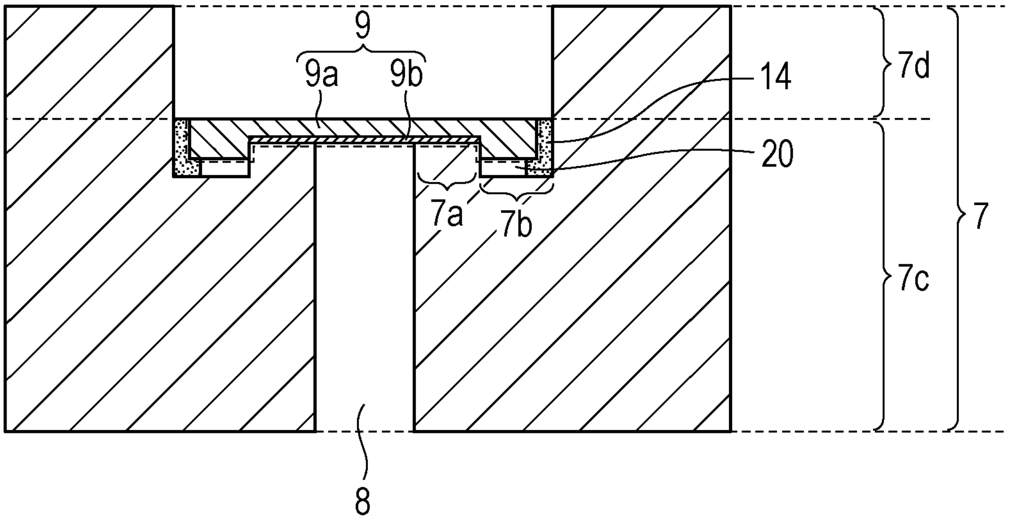
FIG. 3 is a cross-sectional view of an anode of the radiation generating tube and the radiation generating device according to EXAMPLE 3 of the invention.

EXAMPLE 3 of the invention is described with reference to FIG. 3. FIG. 3 is a cross-sectional view of the anode 10 in an enlarged manner of the radiation generating device. This example differs from EXAMPLE 1 in that the target substrate 9*a* of the target 9 has a recessed portion in a surface of the target substrate 9*a* at the side facing the electron passage 8. The recessed portion and the isolating portion 7*a* of the rear shield body 7*c* form a fitting structure. With this structure, the position of the target 9 can become easily stable.

The radiation generating device was fabricated in a manner similar to EXAMPLE 1 except that the connection form between the rear shield body and the target layer was different. When the spectrum of radiation rays generated from the radiation generating device of this example was measured, the spectrum of silver contained in the brazing material was not observed. Also, the radiation quality was not decreased even if the device was continuously used for a long period like EXAMPLE 1, and the device had good performance that stably generated radiation rays.

Example 4

Figure 4:
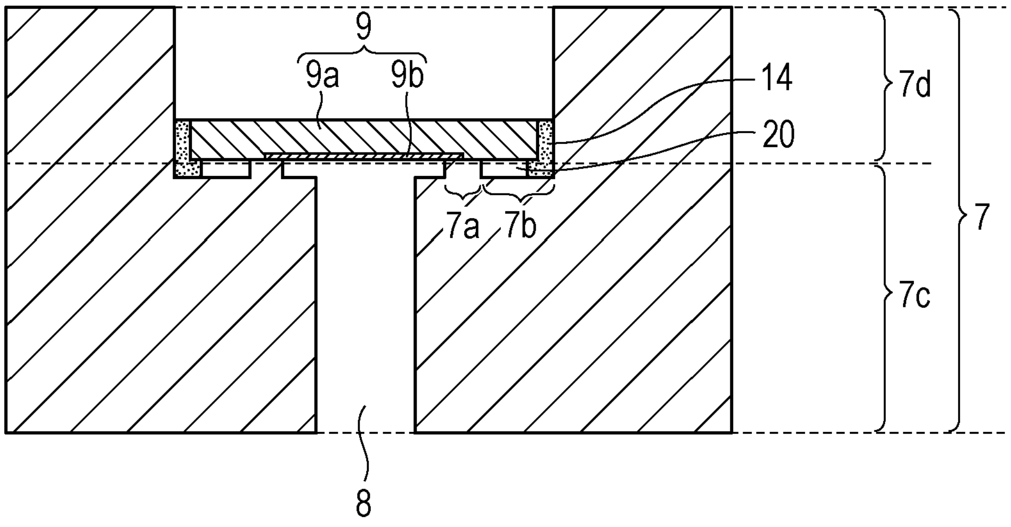
FIG. 4 is a cross-sectional view of an anode of the radiation generating tube and the radiation generating device according to EXAMPLE 4 of the invention.

EXAMPLE 4 of the invention is described with reference to FIG. 4. FIG. 4 is a cross-sectional view of the anode 10 in an enlarged manner of the radiation generating device. This example differs from EXAMPLE 1 in that the diameter of the electron passage 8 at the side of the target 9 is larger than the diameter of the electron passage 8 at the side of the electron emitting source 3. To be specific, the diameter at the side of the electron emitting source 3 was 2 mm, the diameter at the side of the target 9 was 4 mm, and the wide portion had a length of 1 mm. With this form, since the isolating portion 7*a* is separated from the focal point, a difference in temperature between the rear shield body 7*c* and the target 9 at the isolating portion 7*a* can be restricted. Consequently, a shear force generated at the contact portion as the result of a change in temperature between stop state and operating state of the radiation generating device can be decreased.

The radiation generating device was fabricated in a manner similar to EXAMPLE 1 except that the connection form between the rear shield body and the target layer was different. When the spectrum of radiation rays generated from the radiation generating device of this example was measured, the spectrum of silver contained in the brazing material was not observed. Also, the radiation quality was not decreased even if the device was continuously used for a long period like EXAMPLE 1, and the device had good performance that stably generated radiation rays.

Example 5

Figure 5:
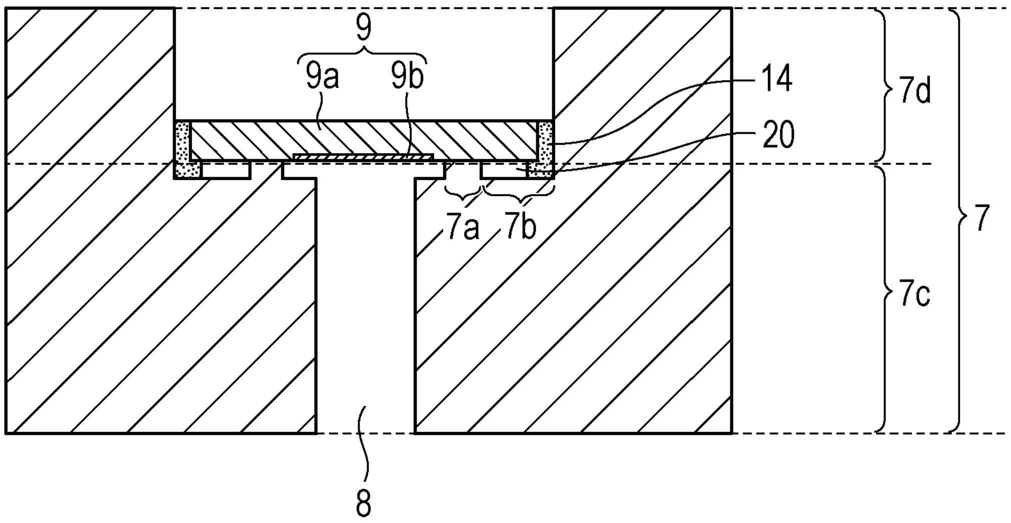
FIG. 5 is a cross-sectional view of an anode of the radiation generating tube and the radiation generating device according to EXAMPLE 5 of the invention.

EXAMPLE 5 of the invention is described with reference to FIG. 5. FIG. 5 is a cross-sectional view of the anode 10 in an enlarged manner of the radiation generating device. In this example, the diameter of the target layer 9*b* is smaller than the inner diameter of the isolating portion 7*a* of the rear shield body 7*c*. The target layer 9*b* does not directly contact the rear shield body 7*c*. Hence, even if the target is shifted from the rear shield body by thermal deformation caused by heat generated when the radiation generating tube is operated, a damage on the target layer due to rubbing by the shift is not generated. In this example, the diameter of the electron passage 8 at the side of the target 9 was larger than the diameter of the electron passage 8 at the side of the electron emitting source 3. However, it is not limited thereto. Similar advantages can be obtained if the diameter of the target layer 9*b* is smaller than the inner diameter of the isolating portion 7*a* of the rear shield body 7*c* like EXAMPLE 4.

The radiation generating device was fabricated in a manner similar to EXAMPLE 1 except that the connection form between the rear shield body and the target layer was different. When the spectrum of radiation rays generated from the radiation generating device of this example was measured, the spectrum of silver contained in the brazing material was not observed. Also, the radiation quality was not decreased even if the device was continuously used for a long period like EXAMPLE 1, and the device had good performance that stably generated radiation rays.

Example 6

Figure 6:
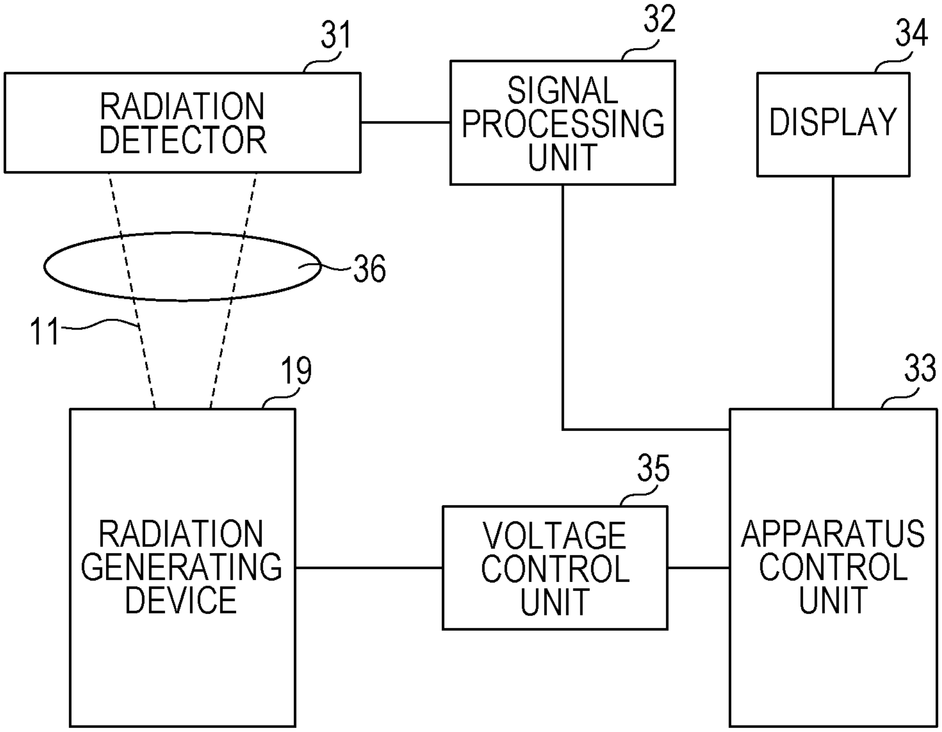
FIG. 6 is a functional block diagram showing a radiation imaging apparatus according to an embodiment (EXAMPLE 6) of the invention.

EXAMPLE 6 of the invention is a radiation imaging apparatus using the radiation generating device. As shown in FIG. 6, the radiation imaging apparatus of this example includes the radiation generating device 19, a radiation detector 31, a signal processing unit 32, an apparatus control unit 33, and a display 34. The radiation detector 31 is connected to the apparatus control unit 33 through the signal processing unit 32. The apparatus control unit 33 is connected to the display 34 and a voltage control unit 35. The radiation generating device in EXAMPLE 1 was used for the radiation generating device 19. The apparatus control unit 33 collectively controls processing in the radiation generating device 19. For example, the apparatus control unit 33 controls radiation imaging by the radiation generating device 19 and the radiation detector 31. The radiation detector 31 detects radiation rays 11 radiated from the radiation generating device 19 through a test body 36. Accordingly, a radiation transmission image of the test body 36 is taken. The display 34 displays the taken radiation transmission image. For example, the apparatus control unit 33 controls driving of the radiation generating device 19 and controls a voltage signal applied to the radiation generating tube through the voltage control unit 35. Hence, the apparatus control unit 33 controls the radiation generating device 19 and the radiation detector 31 in an associated manner.

The radiation imaging apparatus of this example had good performance that can obtain a stable radiographic image even if the apparatus is used for a long period like EXAMPLE 1.

With the embodiments and examples of the invention, the anode, which is fabricated by brazing the rear shield body and the target, has the structure in which the brazing material does not flow to the target-formation region or the electron passage, and the electron beam is not directly emitted on the brazing material. Accordingly, a decrease in radiation quality can be restricted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-006831 filed Jan. 18, 2013, which is hereby incorporated by reference herein in its entirety.

What is claimed is:

1. A radiation generating tube comprising:

an electron source configured to emit an electron beam;

a target configured to generate radiation upon irradiation with the electron beam; and a backward tubular shield member jointed to a periphery of the target via a brazing material and extending toward the electron source such that the electron beam passes through, wherein the target, the backward tubular shield member and the brazing material form a closed space isolated from an electron beam passage from the electron source to the target.

2. The radiation generating tube according to claim 1, wherein the target includes a target layer having a target material, and a target substrate configured to support the target layer, the target substrate located at an opposite side of the electron source with respect to the target.

3. The radiation generating tube according to claim 1, wherein the target has a tapered portion at a periphery thereof, and wherein the tapered portion forms the closed space with the backward tubular shield member and the brazing material.

4. The radiation generating tube according to claim 1, wherein the backward tubular shield member contains at least one metal material selected of tungsten, tantalum, molybdenum, zirconium, and niobium, or contains an alloy of at least one of these materials.

5. The radiation generating tube according to claim 1, wherein the brazing material is a material selected from a chromium-vanadium alloy, a titanium-tantalum-molybdenum alloy, a titanium-vanadium-chromium-aluminum alloy, a titanium-chromium alloy, a titanium-zirconium-beryllium alloy, a zirconium-niobium-beryllium alloy, a gold-copper alloy, nickel solder, brass solder, silver solder, and palladium solder.

6. A radiation generating device comprising:

the radiation generating tube according to claim 1; and a driving power supply electrically connected to the radiation generating tube and configured to drive the radiation generating tube.

7. A radiation imaging apparatus comprising:

the radiation generating device according to claim 6;

a radiation detector configured to detect radiation emitted from the radiation generating device and transmitted through a test body; and an apparatus control unit configured to control the radiation generating device and the radiation detector in an associated manner.

8. The radiation generating tube according to claim 1, wherein the backward tubular shield member has an inward protruding portion protruding inwardly with respect to a joint portion jointed to the periphery of the target.

9. The radiation generating tube according to claim 8, wherein the inward protruding portion has a contact region at which the backward tubular shield member contacts an electron source side surface of the target.

10. The radiation generating tube according to claim 9, wherein the contact region is spaced apart from the joint portion.

11. The radiation generating tube according to claim 9, wherein the contact region separates the closed space from the electron beam passage.

12. The radiation generating tube according to claim 9, wherein the contact region separates the closed space from the electron beam passage.

13. The radiation generating tube according to claim 9, wherein the inward protruding portion has a concave region located far away from the electron source side surface of the target a contact region with respect to the contact region.

14. The radiation generating tube according to claim 13, wherein the target includes a target layer having a target material and a target substrate located at an opposite side of the electron source with respect to the target and configured to support the target layer, wherein the target substrate has a recessed portion which is spaced apart from the periphery and is configured to receive the contact region.

15. The radiation generating tube according to claim 1, wherein the closed space is annular.

* * * * *